US008364356B2

United States Patent
Young et al.

(10) Patent No.: US 8,364,356 B2
(45) Date of Patent: Jan. 29, 2013

(54) DRIVE CONTROL SYSTEM FOR A VEHICLE AND METHOD

(75) Inventors: Christopher L. Young, Fargo, ND (US); Jason L. Magnuson, Fargo, ND (US); Spencer L. Mindeman, West Fargo, ND (US)

(73) Assignee: Clark Equipment Company, West Fargo, ND (US)

( * ) Notice: Subject to any disclaimer, the term of this patent is extended or adjusted under 35 U.S.C. 154(b) by 0 days.

(21) Appl. No.: 13/550,155

(22) Filed: Jul. 16, 2012

(65) Prior Publication Data
US 2012/0283915 A1    Nov. 8, 2012

Related U.S. Application Data

(63) Continuation of application No. 12/061,154, filed on Apr. 2, 2008, now Pat. No. 8,239,104.

(60) Provisional application No. 60/932,785, filed on Jun. 1, 2007.

(51) Int. Cl.
*G06F 7/70* (2006.01)
*B62M 27/02* (2006.01)
*F16H 59/00* (2006.01)
*G05G 13/00* (2006.01)
*G05G 11/00* (2006.01)

(52) U.S. Cl. ............ 701/50; 701/69; 180/190; 180/192; 74/335; 74/483 R; 74/484 R

(58) Field of Classification Search .................... 701/50, 701/69; 180/190, 192; 74/335, 483
See application file for complete search history.

(56) References Cited

U.S. PATENT DOCUMENTS

| 5,649,606 A | 7/1997 | Bebernes et al. |
|---|---|---|
| 6,523,635 B1 | 2/2003 | Johnston et al. |
| 8,108,109 B2 | 1/2012 | Young et al. |
| 2002/0100630 A1 | 8/2002 | Evans et al. |
| 2003/0201134 A1 | 10/2003 | Ishii et al. |
| 2006/0032691 A1 | 2/2006 | Strong |
| 2006/0230848 A1 | 10/2006 | Miller et al. |
| 2006/0254840 A1 | 11/2006 | Strong |
| 2008/0083578 A1 | 4/2008 | Kelly et al. |

FOREIGN PATENT DOCUMENTS

| DE | 1555247 A1 | 10/1970 |
|---|---|---|
| EP | 1022395 A1 | 7/2000 |
| JP | 11334622 | 7/1999 |

OTHER PUBLICATIONS

Search Report and Written Opinion of the International Searching Authority dated Aug. 28, 2008 in application PCT/US2008/006847, filed May 30, 2008, 11 pages.

(Continued)

*Primary Examiner* — James Trammell
*Assistant Examiner* — Majdi Alsomiri
(74) *Attorney, Agent, or Firm* — John D. Veldhuis-Kroeze; Westman, Champlin & Kelly, P.A.

(57) ABSTRACT

A method of altering a drive parameter of a machine having a drive system that is configured to operate a left side of the machine independently of the right side of the machine. The method includes entering, by a user, a drive parameter alteration mode by actuating a first input, and actuating a second input to alter one or more parameters associated with a controller of the machine.

12 Claims, 6 Drawing Sheets

OTHER PUBLICATIONS

Communication dated Apr. 1, 2010 in European application No. 08767966.8 filed May 30, 2008, 2 pages.

Communication dated Aug. 25, 2011 in European application No. 08767958.5 filed May 30, 2008, 3 pages.

"Application Software Dual Path Control DPC, RE 95 325/03.04," Mar. 2004, Bosch Rexroth AG 89275 Elchingen, Germany, XP002493624.1, 16 pages.

Search Report and Written Opinion of the International Searching Authority in application PCT/US2008/006838, filed May 30, 2008, 14 pages.

Communication dated Nov. 2, 2010 in European application No. 08767958.5 filed May 30, 2008, 3 pages.

Communication dated Feb. 22, 2012 in Chinese application No. 200880018284.X, filed May 30, 2008, with English translation attached, 20 pages.

DRIVE CONTROL SYSTEM FOR A VEHICLE AND METHOD

CROSS-REFERENCE TO RELATED APPLICATION

The present application is a continuation of and claims priority of U.S. patent application Ser. No. 12/061,154 which, along with related U.S. patent application Ser. No. 12/061,015, issued as U.S. Pat. No. 8,108,109 B2, claims the benefit of U.S. provisional patent application Ser. No. 60/932,785, filed Jun. 1, 2007. The contents of the aforementioned applications are hereby incorporated by reference in their entirety.

FIELD

The invention relates to systems and methods for controlling a drive system associated with a machine. The invention may be used, for example, in a compact construction vehicle such as a skid steer loader.

BACKGROUND

Compact construction vehicles typically include a prime mover, such as an internal combustion engine, which drives a hydraulic system. The hydraulic system includes hydraulic pumps that supply hydraulic fluid to hydraulic cylinders for raising and lowering lift arms, curling and dumping a bucket, and manipulating other auxiliary devices. The hydraulic system also includes one or more pumps that provide a flow of hydraulic fluid to hydraulic motors that rotate the wheels or tracks of the vehicle. Some vehicles are equipped with variable displacement pumps that are utilized to vary the flow of hydraulic fluid to the hydraulic motors, thereby affecting the operation of the hydraulic motors.

SUMMARY

In one embodiment, the invention provides a method of altering a drive parameter of a vehicle having a drive system with a first drive and a second drive independently operating from the first drive. The vehicle further has an input device interfacable with an operator. The method includes receiving a first input from the operator via the input device, varying an initial output limit of the drive system based on the first input, receiving a second input from the operator via the input device, and controlling the drive system to result in movement of the vehicle based on the second input. The controlling includes limiting the drive output to the initial output limit, and then increasing the drive output from the initial output limit.

In another embodiment, the invention provides a vehicle including an engine, a first drive controllably under the influence of the engine, a second drive controllably under the influence of the engine, an input device interfacable with an operator; and a controller coupled to the input device, the first drive, and the second drive. The controller including a processor and memory to receive a first input from the operator via the input device, vary an initial output limit of the drive system based on the first input, receive a second input from the operator via the input device, and control the drive system to drive the vehicle based on the second input. The controlling the drive system includes limiting the first drive output to the initial output limit, and then increasing the first drive output from the initial output limit.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
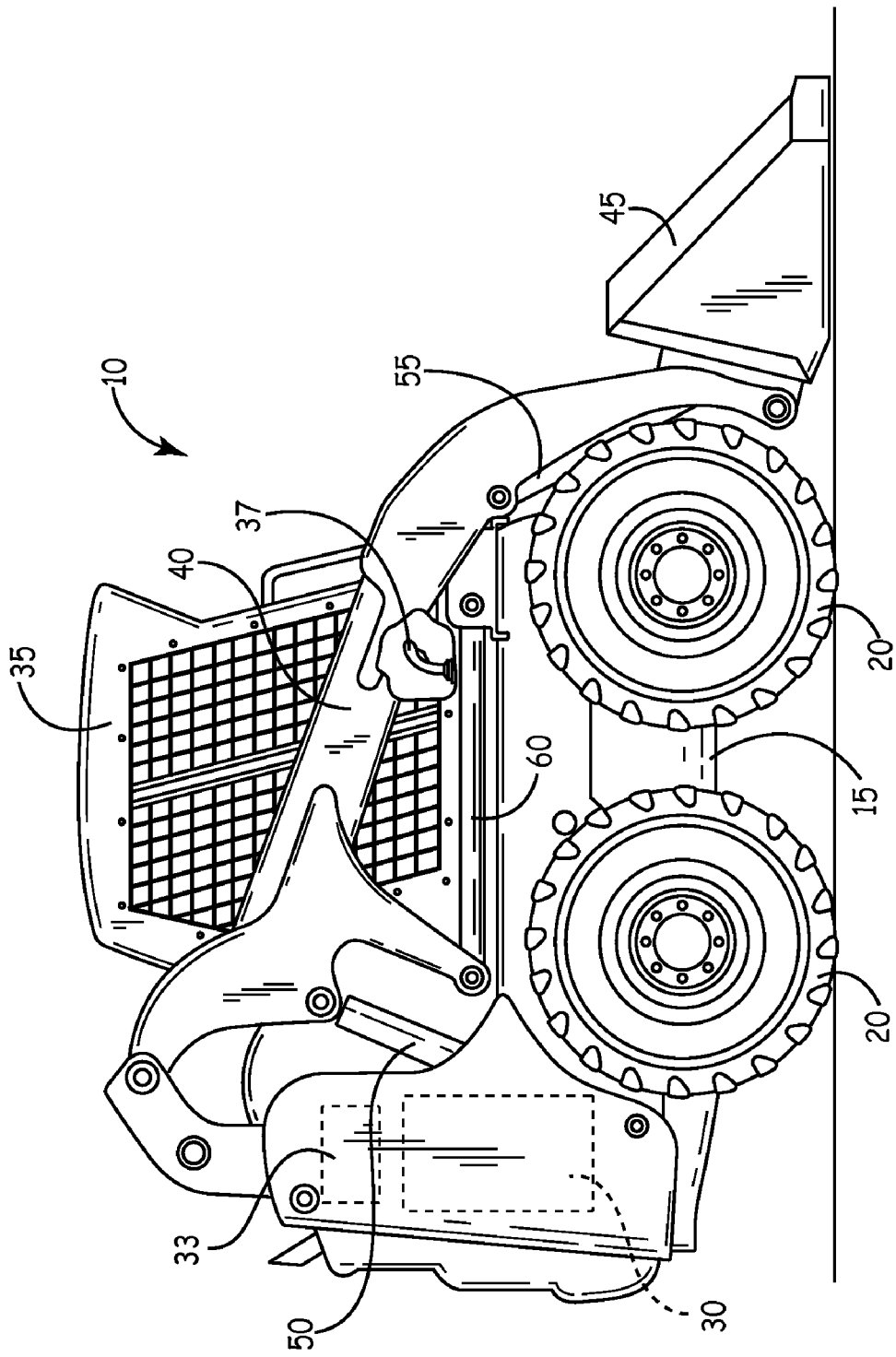
FIG. 1 is a side view of a vehicle including a hydraulic fluid control system.
Figure 2:
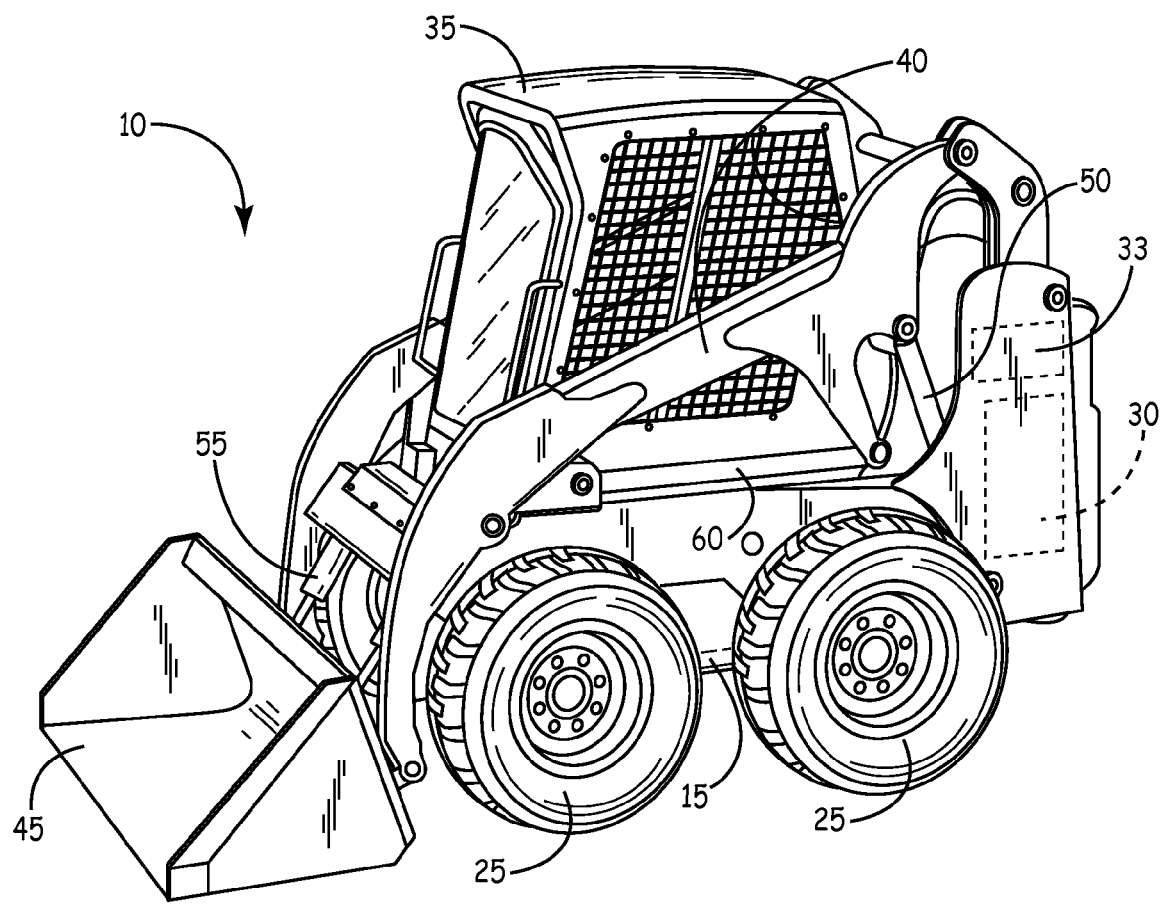
FIG. 2 is a perspective view of the vehicle shown in FIG. 1.

FIGS. 1 and 2 depict a skid steer loader 10 having a frame 15 supported by two right side wheels 20 and two left side wheels 25, an internal combustion engine 30, a hydraulic system 33, an operator compartment 35 (that contains a vehicle control 37), a lift arm 40, and a bucket 45 mounted for tilting between the distal ends of the lift arm 40. Although the invention is illustrated as being embodied in the skid steer loader 10, the invention may be embodied in other vehicles and machines (e.g., an all-wheel steer loader, a compact track loader, etc.). As illustrated, the vehicle control 37 includes one or more joysticks. In other embodiments, the control may include a one or more foot pedals, steering wheels, remote controls, and the like.

The right side wheels 20 (or tracks) are driven independently of the left side wheels 25 (or tracks). When all four wheels 20, 25 turn at the same speed, the loader 10 moves forward and backward, depending on the direction of rotation of the wheels 20, 25. The loader 10 turns by rotating the right and left side wheels 20, 25 in the same direction but at different rates, and rotates about a substantially zero turn radius by rotating the right and left side wheels 20, 25 in opposite directions.

In some embodiments, the right side wheels 20 and left side wheels 25 are driven by two separate hydraulic motors (e.g., one hydraulic motor dedicated to each side) that are included in the hydraulic system 33, as described in greater detail below. The hydraulic motors are supplied with hydraulic fluid from a hydraulic pump. In one embodiment, the hydraulic pump is a dual variable displacement hydraulic pump that implements a pair of swash plate devices to vary the amount of hydraulic fluid that is allowed to flow to the hydraulic motors (e.g., vary the "pump stroke"). For example, the swash plates can be actuated by an electronically controlled coil to vary the amount of hydraulic fluid that is supplied to the hydraulic motors, and thus, the output of the hydraulic motors.

The lift arm 40 raises (i.e., rotates counterclockwise in FIG. 1) and lowers (i.e., rotates clockwise in FIG. 1) with respect to the frame 15 under the influence of lift cylinders 50 mounted between the frame 15 and the lift arms 40. The bucket 45 tilts with respect to the lift arm 40 to curl (i.e., rotate counterclockwise in FIG. 1) and dump (i.e., rotate clockwise in FIG. 1) under the influence of tilt cylinders 55 mounted between the lift arm 40 and the bucket 45. Various auxiliary implements or devices may be substituted for or used in conjunction with the bucket 45. An example, but by no means exhaustive, list of auxiliary implements includes augers, jack hammers, trenchers, grapples, rotary sweepers, stump grinders, saws, concrete mixers, pumps, chippers, snow throwers, rotary cutters, and backhoes.

Figure 3:
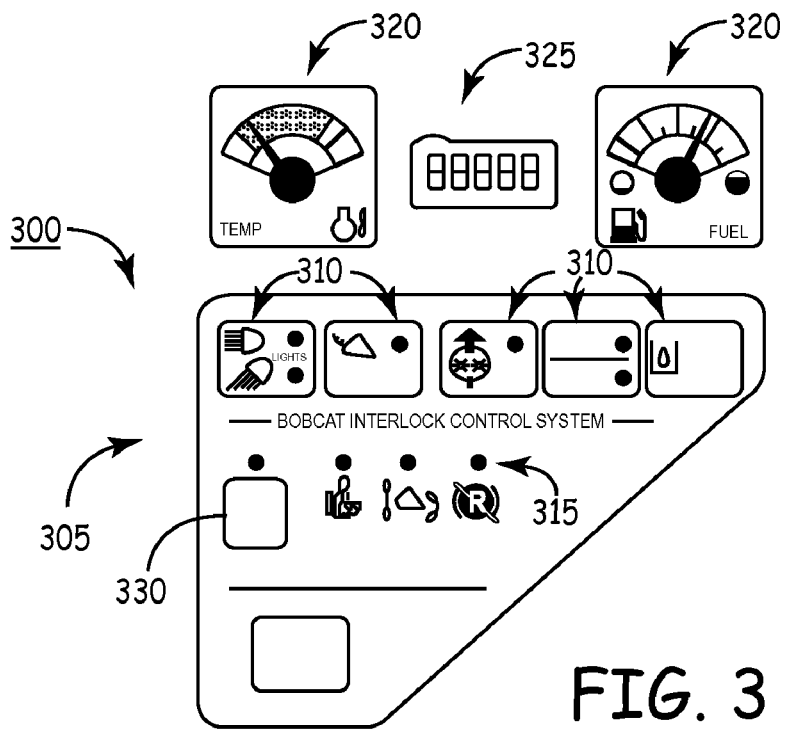
FIG. 3 illustrates an operator control panel of a vehicle, such as the vehicle shown in FIGS. 1 and 2.

FIG. 3 illustrates an operator control panel 300 of a machine, such as the skid steer loader shown in FIGS. 1 and 2. The operator control panel 300 allows an operator of the loader to control one or more functions of the loader. The operator control panel 300 can also be used to indicate the status or mode of the loader. In the embodiment shown in FIG. 3, the operator control panel 300 includes an input pad 305 having one or more user actuateable buttons 310 and indicator light emitting diodes ("LEDs") 315, one or more analog display elements 320, and a digital display element 325. However, in other embodiments, the operator control panel 300 may include more or fewer elements than those shown. The operator control panel 300 may also include a variety of additional or substitute switches, knobs, buttons, indicators, and the like.

The buttons 310 on the input pad 305 allow a user to control functions associated with the machine. For example, the buttons 310 can be actuated to turn lights (e.g., headlights) on and off, control hydraulic systems, and control auxiliary components. The indicator LEDs 315 are used to indicate a state or status of a function of the machine (e.g., indicate that a seat restraint has been activated). In some embodiments, the buttons 310 may include integrated LEDs to indicate the status of the machine function associated with the button 310. For example, an integrated LED may be lit after the button 310 is actuated to indicate that the loader function associated with the button 310 is active.

In some embodiments, one of the buttons can be actuated to alter a drive parameter associated with the hydraulic pump of the loader. For example, actuating a drive parameter alteration button 330 (e.g., a "Press to Operate Loader" button) allows the user to adjust the flow of hydraulic fluid to the hydraulic motors using the hydraulic pump and swash plates. As described in greater detail below, this hydraulic fluid flow adjustment can be made to adjust the tracking (i.e., directional alignment) of the loader, or to adjust the responsiveness (i.e., the manner in which the loader reacts to user input) of the loader.

The analog display elements 320 can be used to indicate the status of one or more systems of the machine. For example, in the embodiment shown in FIG. 3, the analog display elements 320 include a coolant temperature gauge and a fuel gauge. In other embodiments, the analog display elements 320 may include other temperature gauges (e.g., hydraulic oil, engine oil, etc.), a battery gauge, an engine RPM gauge, an engine oil pressure gauge, a hydraulic oil pressure gauge, and the like.

The digital display element 325 can also be used to indicate the status of one or more systems of the machine to an operator. For example, in the embodiment shown in FIG. 3, the digital display element 325 can be used to display a duration of time that an engine of the machine has been running (e.g., an hour meter). Additionally, the digital display element 325 can be used to indicate system errors and/or malfunctions (e.g., error codes associated with control systems of the machine). In some embodiments, the digital display element 325 is also used to indicate changes to drive parameters. For example, as described in greater detail below, a user can initialize a drive control mode and/or a tracking adjustment mode in which drive system parameters are changed using the drive parameter alteration button 330. Accordingly, the digital display element 325 can be used to indicate that the modes have been initialized, as well as indicate changes that are made to drive system parameters. In the embodiment shown in FIG. 3, the digital display element 325 is a series of seven segment LEDs. In other embodiments, however, the digital display element 325 may be a liquid crystal display ("LCD") or other display device.

Figure 4:
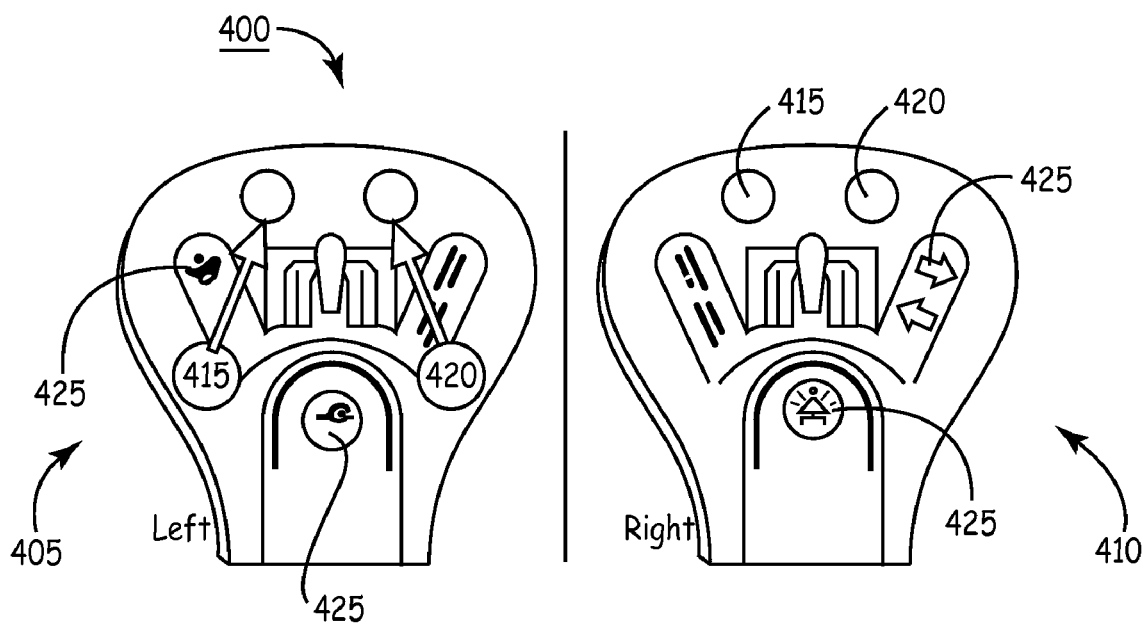
FIG. 4 illustrates an operator control device of a vehicle, such as the vehicle shown in FIGS. 1 and 2.

FIG. 4 illustrates a pair of operator control devices 400 of a machine, such as the skid steer loader shown in FIGS. 1 and 2. In the embodiment shown in FIG. 4, the operator control devices 400 include a left joystick and a right joystick 410. However, in other embodiments, alternative operator control devices (e.g., a single joystick, a steering wheel, other paddles, pedals, knobs, switches, and the like) can be employed.

The joysticks 405 and 410 are movable independently of one another, and are linked to a hydraulic drive system of the machine. For example, in some embodiments, the left joystick 405 is linked to a hydraulic motor that controls the left side wheels of the machine, while the right joystick 410 is linked to a hydraulic motor that controls the right side wheels of the machine. Accordingly, when the joysticks 405 and 410 are actuated (e.g., pressed or pulled) with the same amount of force, the left side wheels and the right side wheels all turn at the same speed. When the joysticks 405 and 410 are actuated with differential amounts of force, or actuated in different directions, the left side wheels and the right side wheels turn at different rates, or in opposite directions, thereby causing the machine to turn.

In some embodiments, the joysticks 405 and 410 can be positioned in a "positive center" position. For example, a device (e.g., a detent) can be used to indicate to the user that the joysticks 405 and 410 are being actuated with the same amount of force and the machine should be traveling straight (e.g., the left side wheels turning at the same rate as the right side wheels). However, due to inefficiencies associated with the hydraulic pump and/or the hydraulic motors, the machine may not travel in a straight line at the positive center position. Accordingly, the user can initialize a tracking adjustment mode (described below) to make relatively small changes to the output of the hydraulic pump and/or the hydraulic motors so that the machine travels straight when the joysticks 405 and 410 are positioned in the positive center position. The tracking adjustment mode may also be used to adjust the machine steering when the machine is traveling over uneven terrain (e.g., on the side of a hill).

The joysticks 405 and 410 each include a left multi-functional button 415 and a right multi-functional button 420, as well as other dedicated function buttons 425. In some embodiments, the left multi-function button 415 and the right multi-function button 420 can be used to alter drive parameters of the machine. For example, as described in greater detail with respect to FIG. 8, the left and right multi-function buttons 415 and 420 can be used to adjust a drive control setting after a user has initiated a drive control mode, as well as to adjust a track setting after the user has initiated a tracking adjustment mode. The dedicated function buttons 425 can be used, for example, for speed control, auxiliary implement control, and the like.

In some embodiments, functionalities associated with the joysticks are instead incorporated into the operator control panel 300 (shown in FIG. 3), and vice versa. For example, in some embodiments, drive parameter adjustments are made with the buttons 310 of the control pad 305 instead of with the left and right multi-function buttons 415 and 420 of the joysticks 405 and 410.

Figure 5:
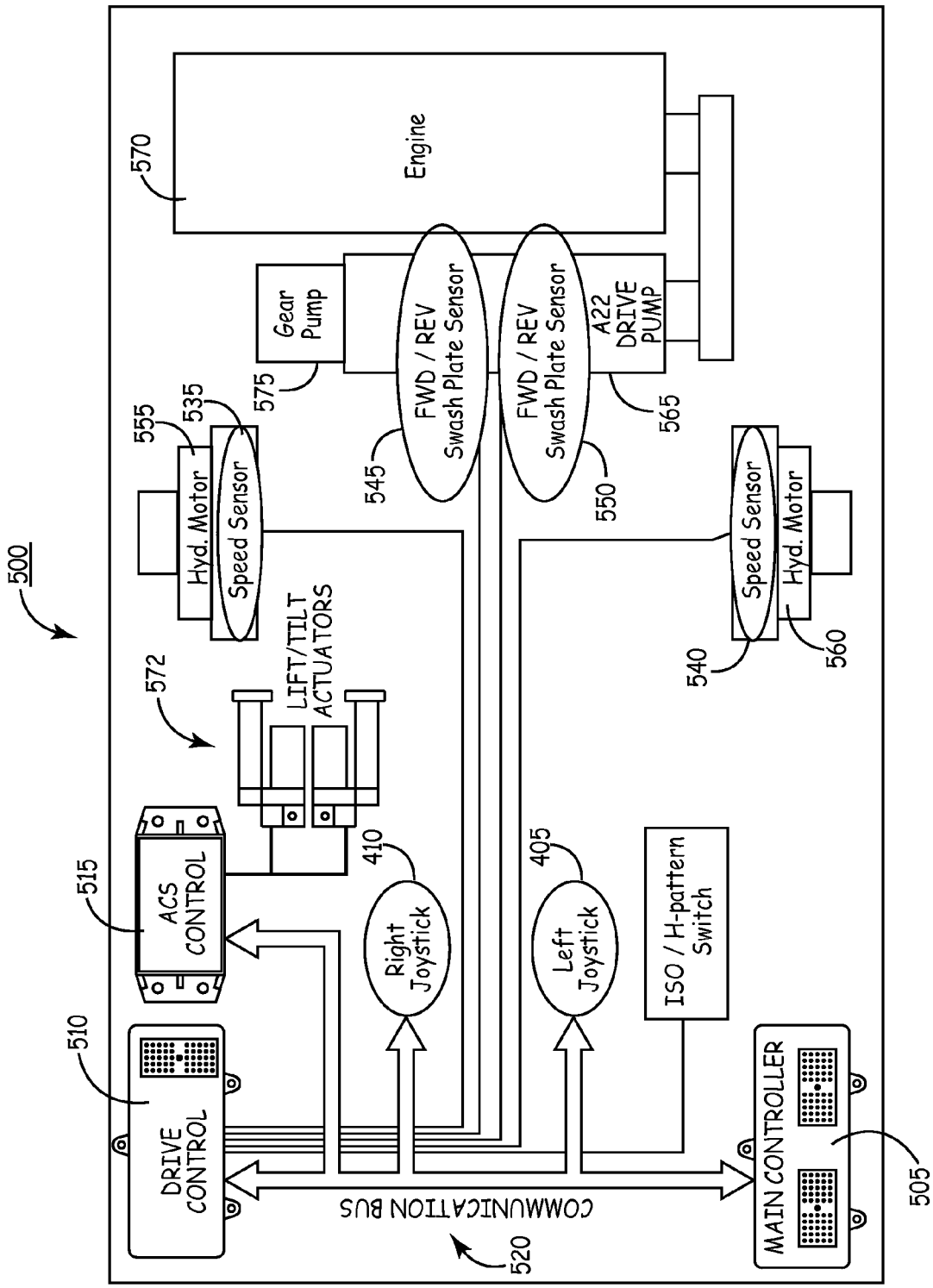
FIG. 5 is a schematic of a control system that can be adapted to a vehicle, such as the vehicle shown in FIGS. 1 and 2.

FIG. 5 illustrates a control system 500 that has a main controller 505, a drive controller 510, an advanced control system ("ACS") controller 515, and other mechanical and electrical components of a machine (e.g., the skid steer loader shown in FIGS. 1 and 2).

As should also be apparent to one of ordinary skill in the art, the system shown in FIG. 5 is a model of what an actual system might be like. Many of the modules and logical structures described are capable of being implemented in software executed by a microprocessor or a similar device or of being implemented in hardware using a variety of components including, for example, application specific integrated circuits ("ASICs"). Terms like "controller" may include or refer to both hardware and/or software. Thus, the invention should not be limited to the specific examples or terminology or to any specific hardware or software implementation or combination of software or hardware.

A communication bus 520 provides a communication link between the main controller 505, drive controller 510, ACS controller 515, the right joystick 410, and the left joystick 405. Each component connected to the communication bus 520 can pass data to the other components connected to the communication bus 520. For example, as described in greater detail below, the left and right joysticks 405 and 410 transmit data (e.g., positional data, data related to the actuation of buttons included on the joysticks, etc.) to the drive controller 510. The drive controller 510 uses the data to control components of the machine.

In some embodiments, the main controller 505 is used to execute processes related to interlock and other safety devices associated with the machine. For example, the main controller 505 can verify that safety interlocks, such as engagement of passenger restraints, have been satisfied. Additionally, the main controller 505 communicates with the drive controller 510 and the ACS controller 515 to verify that they are online and operating properly.

The drive controller 510 is also linked to a right hydraulic motor speed sensor 535, a left hydraulic motor speed sensor 540, a right swash plate actuator and sensor 545, and a left swash plate actuator and sensor 550. The right hydraulic motor speed sensor 535 is mounted proximate to a right hydraulic motor 555 (i.e., the hydraulic motor associated with the right side of the machine), while the left hydraulic motor speed sensor 540 is mounted proximate to a left hydraulic motor 560 (i.e., the hydraulic motor associated with the left side of the machine). Accordingly, the right hydraulic motor speed sensor 535 and the left hydraulic motor speed sensor 540 transmit a signal to the drive controller 510 that is indicative of the speed of the right hydraulic motor 555 and the left hydraulic motor 560, respectively.

The right swash plate actuator and sensor 545 and the left swash plate actuator and sensor 550 are associated with a dual drive pump 565 (e.g., a drive pump having a pair of hydraulic pumps and associated swash plates). Accordingly, the drive controller 510 can be used to control functions of the dual drive pump 565. For example, the right swash plate actuator and sensor 545 can receive a control signal from the drive controller 510 to change the position of a swash plate associated with one of the hydraulic pumps included in the dual drive pump 565. Likewise, the left swash plate actuator and sensor 550 can receive a control signal from the drive controller 510 to change the position of a swash plate associated with the other hydraulic pump included in the dual drive pump 565. In some embodiments, the control signal is a 400 milliamp to a 1.6 amp signal that is generated by the controller 510. For example, when a 1.6 amp signal is transmitted to the swash plates from the drive controller 510, the swash plates are positioned at a relatively sharp angle, thereby resulting in a relatively large pump stroke (and resulting hydraulic fluid displacement). Alternatively, when a 400 mA signal is transmitted to the swash plates from the drive controller 510, the swash plates are positioned approximately perpendicular to the axis of rotation, thereby resulting in a relatively short pump stroke (and resulting hydraulic fluid displacement). As previously described, the swash plates can be actuated independently of one another. In other embodiments, an alternative control signal may be used. The right swash plate actuator and sensor 545 and the left swash plate actuator and sensor 550 can also transmit feedback signals to the drive controller that are indicative of the positions of the swash plates.

The ACS controller 515 is used to control lift and/or tilt actuators 572 associated with auxiliary implements of the machine (e.g., a bucket, forks, an auger, etc.). The schematic also illustrates an engine 570 and a gear pump 575. The engine 570 can be used to drive the pump 565, while the gear pump 575 can be used to provide a constant supply or flow of hydraulic fluid to the pump 565.

Figure 6:
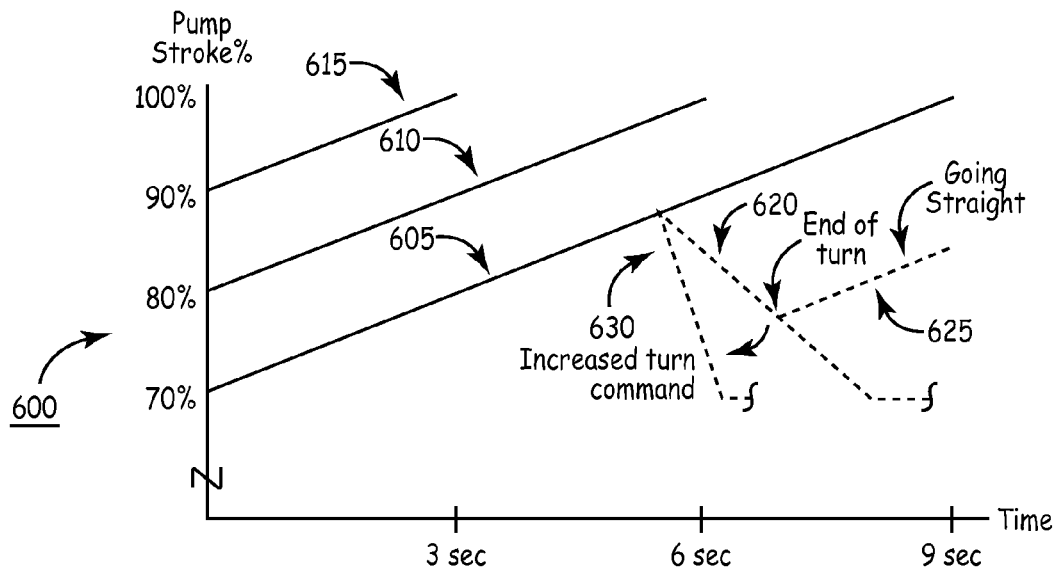
FIG. 6 is a plot that illustrates the operation of a hydraulic pump over time.

FIG. 6 illustrates a plot 600 of the operation of a hydraulic pump (such as the hydraulic pump 565 shown in FIG. 5) over time. The plot 600 illustrates a varying initial output or "pump stroke" of a hydraulic pump associated with a first control mode 605, a second control mode 610, and a third control mode 615.

In some embodiments, the initial pump stroke of a hydraulic pump can be limited, for example, by actuating a swash plate (previously described) to limit the displacement of hydraulic fluid. By limiting the initial pump stroke of the hydraulic pump, hydraulic motors associated with the pump may respond more slowly than if full output of the hydraulic pump is allowed. For example, if a user requests full power from the hydraulic motors (e.g., the user presses both joysticks all the way forward), the hydraulic pump responds by delivering a maximum flow of hydraulic fluid (e.g. the output of the hydraulic pump is 100%) to the hydraulic motors. Accordingly, the hydraulic motors may lurch or "jump" with the sudden inrush of hydraulic fluid. However, if the initial pump stroke is limited, less hydraulic fluid flows to the hydraulic motors and a smoother response by the hydraulic motors can be achieved.

As shown in FIG. 6, the first control mode 605 initially limits the output of the hydraulic pump by approximately 30% of the maximum allowed pump stroke. The output of the hydraulic pump then linearly increases over approximately nine seconds until full (e.g., 100%) output is achieved. The second control mode 610 initially limits the output of the hydraulic pump by approximately 20%. The output of the hydraulic pump then linearly increases over approximately six seconds until full output is achieved. The third control mode 615 initially limits the output of the hydraulic pump by approximately 10%. The output of the hydraulic pump then linearly increases over approximately three seconds until full output is achieved. Accordingly, in response to actuation of a user input, the first control mode 605 produces the smoothest response by the hydraulic motors, the second control mode 610 produces a medium or middle response by the hydraulic motors, and the third control mode 615 provides the fastest, or most immediate, response by the hydraulic motors.

In the embodiment shown in FIG. 6, the rate at which the output of the hydraulic pump is allowed to increase is constant (e.g., linear) while the user is requesting full power from the hydraulic motors in the forward direction (e.g., the user presses both joysticks all the way forward). However, in other embodiments, the rate at which the output of the hydraulic pump is allowed to increase is not constant. For example, in one embodiment, the rate increases by a first rate (e.g., 3% per second) for a first amount of time, and a second rate (e.g., 5% per second) for a second amount of time. As should be appreciated by one of ordinary skill in the art, other control schemes are also possible.

In some embodiments, if a user reduces the requested power from a full power while the output is being increased (e.g., user is requesting less than 80% of full power), the rate at which the output of the hydraulic pump is allowed to increase levels (e.g., stops increasing), or begins to decrease back toward the initial (limited) allowed output. Additionally, if a user attempts to vary the output of one hydraulic pump relative to another hydraulic pump (e.g., turns), the rate at which the output of the hydraulic pump is allowed to increase may level (e.g., stops increasing), or begin to decrease back toward the initial (limited) allowed output, as shown by dashed line 620. After turning, if the user resumes traveling relatively straight, the allowed output of the hydraulic pumps may be increased, as shown by dashed line 625. Additionally, if a user attempts to decrease the radius of the turn, the rate at which the output of the hydraulic pump is allowed to increase may decrease back toward the initial (limited) allowed output at a faster rate, as shown by dashed line 630.

Figure 7:
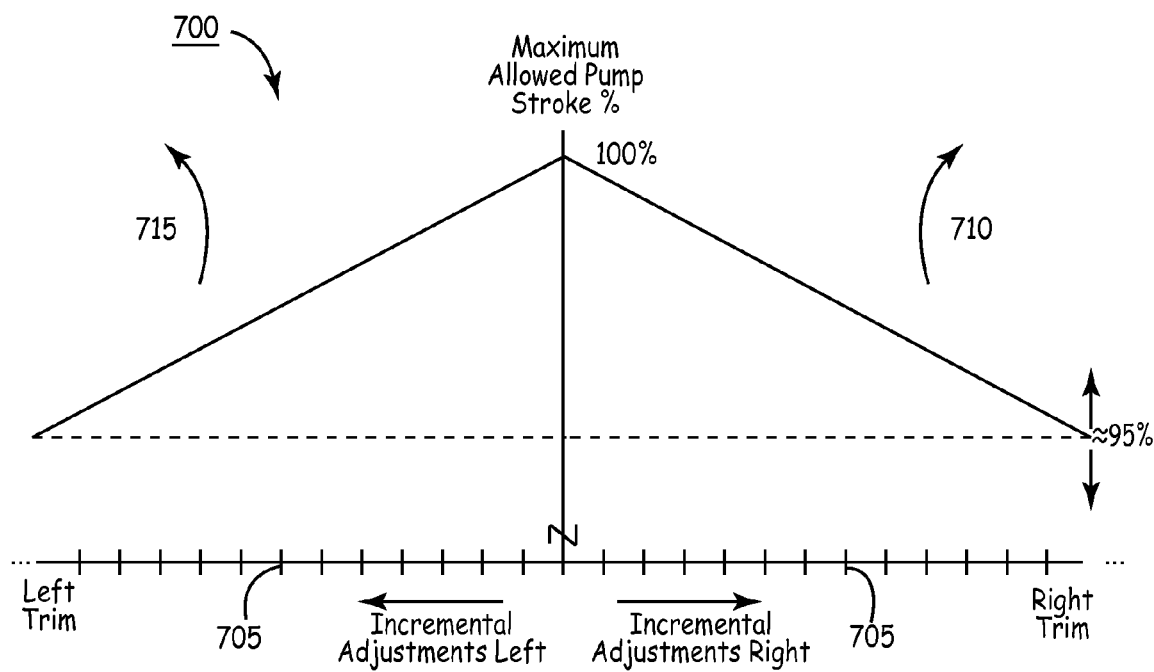
FIG. 7 is a plot that illustrates a hydraulic pump output adjustment.

FIG. 7 illustrates a plot 700 of an output or stroke adjustment of a hydraulic pump (such as the hydraulic pump 565 shown in FIG. 5). The plot 700 illustrates varying the output or "pump stroke" of a dual hydraulic pump that independently supplies hydraulic fluid to a hydraulic motor associated with a right side of a machine and a hydraulic motor associated with a left side of a machine.

In some embodiments, as previously described, a user can position an operator control device, or devices, in a positive center position that is intended to steer the machine in a straight line. However, due to inefficiencies of the hydraulic pump or hydraulic motors, and/or uneven terrain on which the machine is operated, the machine may not travel straight when the operator control device is positioned in the positive center. For example, due to relatively small differences between a hydraulic motor associated with the right side of the machine and a hydraulic motor associated with the left side of the machine, the machine may steer or track to the right or to the left when the operator control device is positioned in the positive center position.

To counter the steering tendencies, an operator may limit or "de-stroke" the output of a hydraulic pump associated with one side of a machine, relative to a hydraulic pump associated with the opposite side of the machine without physically altering the position of the operator controls from the positive center position. For example, in some embodiments, a user can actuate an operator input (e.g., a button) that incrementally trims or de-strokes the output of the hydraulic pump associated with one side of the machine relative to the other side of the machine. In the embodiment shown in FIG. 7, each incremental adjustment 705 corresponds to a reduction of hydraulic pump output by approximately 0.4 percent. In other embodiments, incremental adjustments may correspond to an alternative reduction in output percentage (e.g., 0.25%, 0.5%, 1%, etc.). These incremental adjustments to hydraulic pump output cause the corresponding hydraulic motors to react, thereby steering the machine to the right (as indicated by arrow 710) or left (as indicated by arrow 715).

Figure 8:
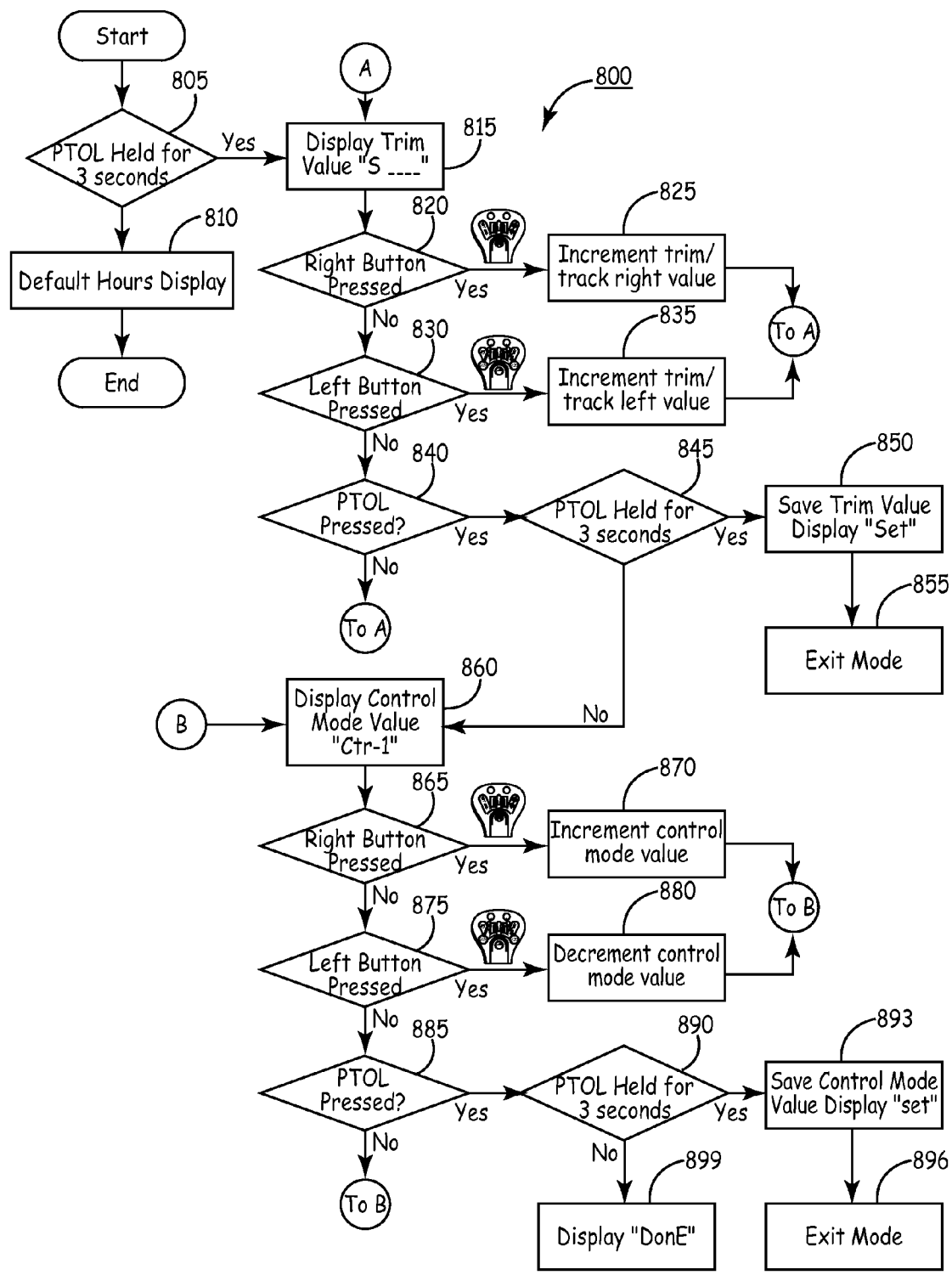
FIG. 8 illustrates a process by which one or more drive system parameters of a machine can be altered.

FIG. 8 illustrates a process 800 by which one or more drive system parameters of a machine, such as the skid steer loader shown in FIGS. 1 and 2, can be altered, although the process 800 can be adapted to other vehicles. The process 800 can be stored in memory and executed by a controller. In some embodiments, as described in greater detail below, the process 800 is split into two distinct and independent processes.

The first step in the process 800 is to verify actuation of a drive parameter alteration input for a predetermined input period (e.g., three seconds) (step 805). In some embodiments, the drive parameter alteration input is a press-to-operate-loader ("PTOL") button (such as the drive parameter alteration button 330 located on the input pad 305 shown in FIG. 3) that the user can actuate while operating the loader. The input period provides a confirmation that the user wishes to alter one or more drive parameters (i.e., the PTOL button was not actuated by mistake). In other embodiments, an alternative input period is used (e.g., two seconds, four seconds, etc.). If the PTOL button is not actuated for the input period (e.g., the PTOL button is momentarily actuated), a display element included in the loader (e.g., the display element 325 shown in FIG. 3) defaults to show the hours of operation of the loader (step 810) and the process 800 ends.

If the PTOL button is actuated for the selected input period, a tracking adjustment mode is entered and the display element indicates a drive system tracking quantity, or "trim value" (step 815). As previously described, entering the tracking adjustment mode allows a user to adjust the maximum output, or set a "trim," of one or more hydraulic pumps associated with the loader. For example, if the output of a hydraulic pump associated with the left side of the loader is limited relative to the output of a hydraulic pump associated with the right side of the loader, the loader will be inclined to go to the left (e.g., see the plot 700 shown in FIG. 7). If the trim value was not previously altered and saved (as described below), the display element initially indicates that no trim has been imposed (e.g., "S----").

After the tracking adjustment mode has been entered, the process 800 is idle (and remains in the tracking adjustment mode) until an input is received from a user. In other embodiments, the process continues to wait for an input from the user for a predetermined amount of time. After that amount of time has passed, the process automatically exits the tracking adjustment mode and ends (i.e., times out).

While the tracking adjustment mode is active, and upon actuation of a right trim input (step 820), a right trim value is incremented (step 825). In some embodiments, the right trim input is a button included on an operator control (e.g., the right multi-function button 420 included on the left joystick 405 shown in FIG. 4). Incrementing the right trim value, as previously described, limits the output of the hydraulic pump associated with the right side of the loader, thereby causing the loader to turn or "track" to the right. In some embodiments, each actuation of the right trim button increments the right trim value by 0.39%. Alternatively stated, each actuation of the right trim button causes the output of the hydraulic pump associated with the right side of the loader to be limited by 0.39%. In other embodiments, the amount of trim imposed on the hydraulic pump with each actuation of the right trim button may be different (e.g., 0.25%, 0.5%, 1%, etc.).

After the right trim value is incremented, the process 800 returns to step 815 and the display element is updated (step 815). For example, the display element will indicate that the right trim button has been actuated (e.g., "S-R01"). In some embodiments, the right trim button may be actuated more than one time, thereby increasing the amount of trim that is imposed on the hydraulic pump associated with the right side of the loader. Accordingly, each time the trim is altered, the display element is updated and incremented (e.g., "S-R02," "S-R03," etc.). In other embodiments, the display element may indicate the trim value differently. For example, the display element may show the percentage that the output of the hydraulic pump has been limited.

Alternatively, while the tracking adjustment mode is active, and upon actuation of a left trim input (step 830), a left trim value is incremented (step 835). In some embodiments, the left trim input, similar to the right trim input, is a button included on an operator control (e.g., the left multi-function button 415 included on the left joystick 405 shown in FIG. 4). Incrementing the left trim value, as previously described, limits the output of the hydraulic pump associated with the left side of the loader, thereby causing the loader to turn or "track" to the left. In some embodiments, the left trim button affects the operation of the loader opposite that of the right trim button. For example, each actuation of the left trim button increments the left trim value by 0.39%. In other embodiments, the amount of trim imposed on the hydraulic pump with each actuation of the left trim button may be different (e.g., 0.25%, 0.5%, 1%, etc.).

If one of the trim values have been previously altered (e.g., one of the trim buttons was actuated), actuation of the other trim button reduces the trim value associated with the other button. For example, if a right trim button has been actuated three times (e.g., the display element indicates "S-R03"), and the left trim button is subsequently actuated, the left trim is incremented by reducing the amount of trim imposed on the hydraulic pump associated with the right side of the loader (e.g., the display element indicates "S-R02"). Subsequent actuations of the left trim button incrementally reduce the amount of trim imposed on the hydraulic pump associated with the right side of the loader until the trim is returned to zero trim (e.g., the display element indicates "S----").

After the right and left trim adjustments are made (or if no adjustments are necessary), a user can actuate the PTOL button (step 840). Upon actuation of the PTOL button, the duration of time that the PTOL button is actuated is verified (step 845). If the PTOL button is actuated for longer than three seconds, the trim values are stored (e.g., stored in memory associated with the drive controller 510 shown in FIG. 5) for future use, and the display element indicates that the control mode has been stored (e.g., "Set") (step 850). In other embodiments, as previously described, an alternative actuation duration may be implemented (e.g., two seconds, four seconds, etc.). The tracking adjustment mode is then exited (step 855). In some embodiments, the stored trim values are automatically implemented during future loader operations. For example, if the loader is powered down and subsequently powered back up (e.g., the engine is turned off and on again), the trim values are automatically implemented. In other embodiments, the trim values may be reset to zero when the loader stops moving and/or the loader is powered down.

Referring again to step 845, if the PTOL button is not actuated for longer than three seconds, a drive system control mode is entered and the display element indicates the current control mode. As previously described, entering the control mode allows a user to adjust the initial displacement or "pump stroke" of hydraulic pumps associated with the loader. For example, if the initial pump stroke of the hydraulic pumps is limited to 70%, the responsiveness of hydraulic components (e.g., the drive system, the auxiliary components, etc.) of the loader will be decreased (e.g., the loader will not react to a user input with full power). The output of the hydraulic pumps is generally regained after a predetermined time has passed (e.g., see the plot 600 shown in FIG. 6).

If the initial output value was not previously altered and saved (as described below), upon entering the control mode the display element initially indicates that a first control mode is active (e.g., "Ctr-1"). In some embodiments, the first or initial control mode corresponds to placing the greatest initial restriction on the initial output of the hydraulic pumps (e.g., the initial output is limited to 70% of full output). Accordingly, as previously described, the smoothest loader response is achieved. In other embodiments, the first control mode corresponds to a zero or low restriction of the initial output of the hydraulic pumps.

After the control mode has been entered, similar to the tracking adjustment mode, the process 800 is idle until an input is received from a user. In some embodiments, the process will continue to wait for an input from the user for a predetermined time. After that time has passed, the process automatically exits the tracking adjustment mode and ends (i.e., times out).

While the control mode is active, and upon actuation of a mode increasing input (step 865), the control mode is incremented (step 870). In some embodiments, the mode increasing input is the same button as the right trim button described above with respect to step 820 (e.g., the right multi-function button 420 included on the left joystick 405 shown in FIG. 4). In other embodiments, a different button is utilized. Incrementing the control mode increases the allowed initial output of the hydraulic pumps. For example, in some embodiments, incrementing the control mode from the first control mode to a second control mode increases the allowed initial output of the hydraulic pumps by 10%. Incrementing the control mode from the second control mode to a third control mode increases the allowed initial output of the hydraulic pumps by an additional 10%. The control mode can be incremented until a zero restriction is implemented on the initial output of the hydraulic pumps.

So, for example, if the first control mode corresponds to limiting the initial output of the hydraulic pumps by 30% (described above), the second control mode corresponds to limiting the initial output of the hydraulic pumps by 20%, and the third control mode corresponds to limiting the initial output of the hydraulic pumps by 10%. In other embodiments, incremental adjustments associated with each control mode may be different. For example, each incremental control mode may reduce restriction imposed on the hydraulic pumps by an alternative amount (e.g., 3%, 5%, 15%, etc.). Additionally, while three control modes are described, as should be appreciated by one of ordinary skill in the art, more or fewer control modes may be implemented.

After the control mode is incremented, the process 800 returns to step 860 and the display element is updated. For example, the display element will indicate that the mode increasing button has been actuated and the control mode has been increased (e.g., "Ctr-2"). In some embodiments, the mode increasing button is actuated more than one time, thereby incrementally increasing the control mode. Accordingly, each time the control mode is altered, the display element is updated and incremented (e.g., "Ctr-3," "Ctr-4," etc.). In other embodiments, the display element may indicate the control mode differently. For example, the display element may show the percentage that the output of the hydraulic pumps has been limited.

Alternatively, while the control mode is active, and upon actuation of a mode decreasing input (step 875), the control mode is decremented (step 880). In some embodiments, the mode decreasing input is the same button as the left trim button described above with respect to step 830 (e.g., the left multi-function button 415 included on the left joystick 405 shown in FIG. 4). In other embodiments, a different button is used. In some embodiments, the mode decreasing input affects the operation of the loader opposite that of the mode increasing input. For example, decrementing the control mode decreases the allowed initial output of the hydraulic pumps (e.g., decrementing the control mode from the second control mode to the first control mode decreases the allowed initial output of the hydraulic pumps by 10%). After the control mode has been decremented, the process 800 returns to step 850 and the display element is updated.

After the control mode adjustments are made (or if no control mode adjustments are necessary), a user can actuate the PTOL button (step 885). Upon actuation of the PTOL button, the time that the PTOL button is actuated is verified (step 890). If the PTOL button is actuated for longer than a predetermined limit, the present control mode is stored (e.g., stored in memory associated with the drive controller 510 shown in FIG. 5) for future use, and the display element indicates that the control mode has been stored (e.g., "Set") (step 893). The control mode is then exited (step 896). In some embodiments, the stored control mode is automatically implemented during future loader operations. For example, if the loader is powered down and subsequently powered back up (e.g., the engine is turned off and on again), the stored control mode is automatically implemented. In other embodiments, the control mode is reset to a default control mode (e.g., the first control mode) when the loader stops moving and/or the loader is powered down.

Referring again to step 890, if the PTOL button is not actuated for longer than three seconds, the present control mode is not stored, and the display element indicates that the control mode has been completed (e.g., "Done") (step 899). The control mode is then exited (step 896).

The embodiments above are described as being implemented by a skid steer loader. However, similar concepts can be applied to a variety of machines or vehicles that employ multiple and/or opposing drive systems. Additionally, the embodiments above are generally described as being carried out by one or more variable displacement pumps. However, alternative drive systems may employ different components (e.g., a variable speed hydraulic motor) to achieve a similar result.

The invention claimed is:

1. A method of altering a drive parameter of a vehicle including a drive system with a first drive and a second drive, the first and second drives each driving a different one of left side wheels or tracks and right side wheels or tracks of the vehicle in response to operator control device positions, the first drive and the second drive having a first drive output and a second drive output, respectively, the second drive output being independent from the first drive output, the vehicle further having an input device interfacable with an operator, the method comprising:

receiving a first input from the operator via the input device to enter a tracking adjustment mode;

varying an output limit for the first drive while in the tracking adjustment mode to trim the output of one of the first and second drives relative to the other of the first and second drives to adjust steering of the vehicle for a positive center operator control device position, the output limit being equal to or less than a maximum output; and controlling the drive system using an operator control device to result in movement of the vehicle, the controlling including limiting the first drive based upon the varied output limit for the first drive.

2. The method of claim 1, further comprising receiving a second input from the operator via the input device, entering a drive control mode based on the second input, and setting an allowed initial output limit based upon the drive control mode.

3. The method of claim 2, further comprising, in or upon exiting the drive control mode, storing the output limit.

4. The method of claim 1, wherein the varying the output limit includes incrementally varying the output limit based on the first input.

5. The method of claim 4, wherein the incrementally varying the output limit is by approximately 0.4 percent of the maximum output.

6. The method of claim 1, further comprising: varying a second output limit for the second drive, the second output limit being equal to or less than a second maximum output, and wherein the controlling the drive system further includes limiting the second drive based upon the varied second output limit.

7. A vehicle comprising:

an engine;

an operator control device manipulable by an operator into a plurality of positions;

first and second drives each controllably under the influence of the engine to produce a first drive output and a second drive output, respectively, the second drive output being independent from the first drive output, wherein the first and second drives each drive a different one of left side wheels or tracks and right side wheels or tracks of the vehicle in response to manipulation of the operator control device;

an input device interfacable with an operator; and a controller coupled to the input device, the first drive, and the second drive, the controller including a processor and memory to receive a first input entered via the input device to:

enter a tracking adjustment mode;

vary an output limit for the first drive while in the tracking adjustment mode to trim the output of one of the first and second drives relative to the other of the first and second drives to adjust steering of the vehicle for a positive center operator control device position, the output limit being equal to or less than a maximum output; and control the first drive and the second drive in response to manipulation of the operator control device to result in movement of the vehicle, the control including limiting the first drive based upon the varied output limit.

8. The vehicle of claim 7, wherein the vehicle includes a hydraulic system coupling the first drive to the engine and the second drive to the engine.

9. The vehicle of claim 7, wherein the input device includes a plurality of input devices.

10. The vehicle of claim 7, wherein the first drive includes a hydraulic motor.

11. The vehicle of claim 7, wherein the processor and memory varies the output limit by incrementally varying the output limit based on the first input.

12. The vehicle of claim 7, wherein the processor and memory varies a second output limit for the second drive output based on the first input, the output limit being equal to or less than a second maximum output, and wherein the processor and memory controls the drive system by limiting the second drive output from traversing the second output limit.

* * * * *